US012670340B2

(12) United States Patent
Dognin et al.

(10) Patent No.: US 12,670,340 B2
(45) Date of Patent: Jun. 30, 2026

(54) REINFORCED GENERATION: REINFORCEMENT LEARNING FOR TEXT AND KNOWLEDGE GRAPH BI-DIRECTIONAL GENERATION USING PRETRAINED LANGUAGE MODELS

(71) Applicant: International Business Machines Corporation, Armonk, NY (US)

(72) Inventors: Pierre L. Dognin, White Plains, NY (US); Inkit Padhi, White Plains, NY (US); Igor Melnyk, White Plains, NY (US); Payel Das, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 17/896,524

(22) Filed: Aug. 26, 2022

(65) Prior Publication Data

US 2024/0070404 A1 Feb. 29, 2024

(51) Int. Cl.
*G06F 40/58* (2020.01)
*G06N 20/00* (2019.01)

(52) U.S. Cl.
CPC ............. *G06F 40/58* (2020.01); *G06N 20/00* (2019.01)

(58) Field of Classification Search
CPC ........ G06N 20/00; G06N 3/092; G06N 3/096; G06N 5/022; G06F 40/279
See application file for complete search history.

(56) References Cited

U.S. PATENT DOCUMENTS

| | | | | |
|---|---|---|---|---|
| 11,271,876 | B2 * | 3/2022 | Yoon | G06N 3/08 |
| 11,709,989 | B1 * | 7/2023 | Mohammed | G06N 3/08 |
| | | | | 706/20 |
| 11,798,529 | B2 * | 10/2023 | Zhu | G06N 3/096 |

(Continued)

FOREIGN PATENT DOCUMENTS

| | | | |
|---|---|---|---|
| CN | 108073673 | A | 5/2018 |
| CN | 109241287 | B | 1/2019 |
| CN | 109271629 | A | 1/2019 |
| CN | 110765235 | A | 2/2020 |
| CN | 111191039 | A | 5/2020 |

(Continued)

OTHER PUBLICATIONS

Xiting Wang, Xinwei Gu, Jie Cao, Zihua Zhao, Yulan Yan, Bhuvan Middha, and Xing Xie. 2021. Reinforcing Pretrained Models for Generating Attractive Text Advertisements. In Proceedings of the 27th ACM SIGKDD Conference. Association for Computing Machinery, New York, NY, USA, 3697-3707. (Year: 2021).*

(Continued)

*Primary Examiner* — Andrew C Flanders
*Assistant Examiner* — Cameron Kenneth Young
(74) *Attorney, Agent, or Firm* — CHIP LAW GROUP

(57) ABSTRACT

Obtain access to a pretrained encoder-decoder language model. Using a dataset including a plurality of text-graph pairs, carry out first fine-tuning training on the pre-trained language model by minimizing cross-entropy loss. A text portion of each text-graph pair includes a list of text tokens and a graph portion of each text-graph pair includes a list of graph tokens. The first fine-tuning training results in an intermediate model. Carry out second fine-tuning training on the intermediate model, by reinforcement learning, to obtain a final model. Make the final model available for deployment.

11 Claims, 10 Drawing Sheets

(56)        References Cited

U.S. PATENT DOCUMENTS

| | | | | |
|---|---|---|---|---|
| 11,847,424 | B1 * | 12/2023 | Harkous ................. | G06N 20/00 |
| 2019/0147355 | A1 * | 5/2019 | Rennie ................... | G06N 3/084 |
| | | | | 706/47 |
| 2020/0050942 | A1 * | 2/2020 | Sun ...................... | G06N 3/0442 |
| 2020/0364603 | A1 * | 11/2020 | Oktay ..................... | G06N 3/08 |
| 2021/0034809 | A1 * | 2/2021 | Potash ................... | G06F 16/313 |
| 2021/0089624 | A1 * | 3/2021 | Bealby-Wright ....... | G06F 40/35 |
| 2021/0209139 | A1 * | 7/2021 | Wu ........................ | G06N 3/044 |
| 2021/0374333 | A1 * | 12/2021 | Song ...................... | G06N 20/00 |
| 2022/0036880 | A1 * | 2/2022 | Zhang .................... | G06F 40/30 |
| 2022/0050964 | A1 * | 2/2022 | Wang .................... | G06F 40/205 |
| 2022/0198136 | A1 * | 6/2022 | Peleg .................... | G06F 40/253 |
| 2022/0237389 | A1 * | 7/2022 | Dognin ................ | G06N 3/0895 |
| 2022/0309597 | A1 * | 9/2022 | Wang .................... | G06V 20/70 |

FOREIGN PATENT DOCUMENTS

| | | | | | |
|---|---|---|---|---|---|
| CN | 111367188 | A | * | 7/2020 | ............. G05B 15/02 |
| CN | 111930784 | A | | 11/2020 | |
| CN | 112307217 | A | | 2/2021 | |
| CN | 112449700 | A | | 3/2021 | |
| CN | 112466291 | A | | 3/2021 | |
| CN | 112612906 | A | | 4/2021 | |
| CN | 113177124 | A | | 7/2021 | |
| CN | 113434668 | B | | 9/2021 | |
| FR | 3082966 | B1 | | 6/2020 | |

OTHER PUBLICATIONS

Pierre L. Dognin, Inkit Padhi, Igor Melnyk, and Payel Das, ReGen: Reinforcement Learning for Text and Knowledge Base Generation using Pretrained Language Models, arXiv:2108.12472v1, submitted online Aug. 27, 2021 (Grace Period Disclosure).

Agarwal et al., "Machine Translation Aided Bilingual Data-to-Text Generation and Semantic Parsing". 3rd International Workshop on Natural Language Generation from the Semantic Web (WebNLG+), Dublin, Ireland (Virtual), Dec. 18, 2020. pp. 6.

Dai et al., "Transformer-XL: Attentive Language Models Beyond a Fixed-Length Context". arXiv:1901.02860v3 [cs.LG] Jun. 2, 2019. pp. 20.

Guo et al., "P2: A Plan-and-Pretrain Approach for Knowledge Graph-to-Text Generation". 3rd International Workshop on Natural Language Generation from the Semantic Web (WebNLG+), Dublin, Ireland (Virtual), Dec. 18, 2020, pp. 7.

Li et al., "Leveraging Large Pretrained Models forWebNLG 2020". 3rd International Workshop on Natural Language Generation from the Semantic Web (WebNLG+), Dublin, Ireland (Virtual), Dec. 18, 2020, pp. 117-124.

Steven J Rennie et al. "Self-critical sequence training for image captioning". 2017 IEEE Conference on Computer Vision and Pattern Recognition. pp. 17.

Ronald J Williams. "Simple statistical gradient-following algorithms for connectionist reinforcement learning". In: Machine learning 8.3-4 (1992), pp. 229-256.

Yang et al., "Improving Text-to-Text Pre-trained Models for the Graph-to-Text Task". 3rd International Workshop on Natural Language Generation from the Semantic Web (WebNLG+), Dublin, Ireland (Virtual), Dec. 18, 2020, pp. 107-116.

Xiting Wang, Reinforcing Pretrained Models for Generating Attractive Text Advertisements. In Proceedings of the 27th ACM SIGKDD Conference. Association for Computing Machinery, New York, NY, USA, 3697-3707. (Year: 2021).

* cited by examiner 1001                                    1003

1003                                    1001

$G = (\mathcal{V}, \mathcal{E})$, a directed graph $\mathcal{V} = \{a,b,c,d\}, \quad \mathcal{E} = \{(a,b), (a,c), (a,d), (c,b)\}$ $G_L = [(a,b), (a,c), (a,d), (c,b)]$ $G_L = [(a,b), (a,d), (a,c), (c,b)]$

DATASET 1 G2T

| Team/model | | G2T METRIC 1 | G2T METRIC 2 | G2T METRIC 3 | G2T METRIC 4 |
|---|---|---|---|---|---|
| PRIOR ART TEAM 1 | | 0.540 | 0.535 | 0.417 | 0.690 |
| PRIOR ART TEAM 2 | | 0.535 | 0.532 | 0.414 | 0.688 |
| PRIOR ART TEAM 3 | | 0.527 | 0.523 | 0.413 | 0.686 |
| PRIOR ART TEAM 4 | | 0.517 | 0.517 | 0.411 | 0.679 |
| ReGen (Ours) G2T.CE | large | 0.553 | 0.549 | 0.418 | 0.694 |
| ReGen (Ours) G2T.RL | large | 0.563 | 0.559 | 0.425 | 0.706 |
| ReGen (Ours) G2T.CE.ES | base (early CE) | 0.522 | 0.518 | 0.404 | 0.675 |
| ReGen (Ours) G2T.RL.ES | base (early CE) | 0.531 | 0.527 | 0.410 | 0.686 |
| ReGen (Ours) G2T.CE.best | • base (best CE) | 0.524 | 0.520 | 0.404 | 0.677 |
| ReGen (Ours) G2T.RL.best | • base (best CE) | 0.527 | 0.523 | 0.408 | 0.681 |

FIG.7

DATASET 1 T2G

| Team/model | Match | T2G METRIC 1 | T2G METRIC 2 | T2G METRIC 3 |
|---|---|---|---|---|
| PRIOR ART TEAM 1 | Exact | 0.689 | 0.689 | 0.690 |
| | Type | 0.700 | 0.699 | 0.701 |
| | Partial | 0.696 | 0.696 | 0.698 |
| | Strict | 0.686 | 0.686 | 0.687 |
| PRIOR ART TEAM 4 | Exact | 0.682 | 0.670 | 0.701 |
| | Type | 0.737 | 0.721 | 0.762 |
| | Partial | 0.713 | 0.700 | 0.736 |
| | Strict | 0.675 | 0.663 | 0.695 |
| ReGen (Ours) T2G.CE | Exact | 0.723 | 0.714 | 0.738 |
| | Type | 0.807 | 0.791 | 0.835 |
| | Partial | 0.767 | 0.755 | 0.788 |
| | Strict | 0.720 | 0.713 | 0.735 |
| ReGen (Ours) T2G.RL | Exact | 0.720 | 0.712 | 0.734 |
| | Type | 0.804 | 0.789 | 0.829 |
| | Partial | 0.764 | 0.752 | 0.784 |
| | Strict | 0.717 | 0.709 | 0.731 |

FIG.8

| DATASET 2 G2T Model | | G2T METRIC 1 | G2T METRIC 2 | G2T METRIC 3 | G2T METRIC 4 |
|---|---|---|---|---|---|
| ReGen—CE | Val | 0.240 | 0.241 | 0.231 | 0.400 |
| | Test | 0.241 | 0.242 | 0.233 | 0.405 |
| ReGen—SCST | Val | 0.258 | 0.259 | 0.240 | 0.418 |
| | Test | 0.262 | 0.262 | 0.242 | 0.422 |

FIG.9

| T2G Model | | T2G METRIC 1 | T2G METRIC 2 | T2G METRIC 3 |
|---|---|---|---|---|
| ReGen—CE | Val | 0.622 | 0.608 | 0.647 |
| | Test | 0.619 | 0.605 | 0.643 |
| ReGen—SCST | Val | 0.615 | 0.600 | 0.640 |
| | Test | 0.623 | 0.610 | 0.647 |

FIG.10

REINFORCED GENERATION: REINFORCEMENT LEARNING FOR TEXT AND KNOWLEDGE GRAPH BI-DIRECTIONAL GENERATION USING PRETRAINED LANGUAGE MODELS

STATEMENT REGARDING PRIOR DISCLOSURES BY THE INVENTOR OR A JOINT INVENTOR

The following disclosure(s) are submitted under 35 U.S.C. 102(b)(1)(A):

Pierre L. Dognin, Inkit Padhi, Igor Melnyk, and Payel Das, ReGen: Reinforcement Learning for Text and Knowledge Base Generation using Pretrained Language Models, arXiv:2108.12472v1, submitted online 27 Aug. 2021.

BACKGROUND

The present invention relates to the electrical, electronic and computer arts, and more specifically, to machine learning systems.

Graph representation of knowledge is a powerful tool to capture real-world information where complex relationships between node entities can be simply encoded. Automatic generation of Knowledge Bases (KBs) from free-form text and its counterpart of generating semantically relevant text from KBs are both active and challenging research topics. A knowledge base includes, for example, entities and relationships (the latter corresponding to how the entities are connected). An example is entity "Abraham Lincoln" and entity "United States" with relationship "President of."

Recently, there has been an increased interest in leveraging Pretrained Language Models (PLMs) to improve performance for text generation from graph, or graph-to-text (G2T) tasks. Indeed, large PLMs that have been pretrained on a vast amount of diverse and variedly structured data, are particularly good candidates for generating natural looking text from graph data. FIG. 1 represents a text 1001 to graph 1003 task, while FIG. 2 represents a graph 1003 to text 1001 task.

Large PLM-related models have been employed by top performers in public challenges where both graph-to-text and text-to-graph (T2G) tasks are offered, under the names RDF-to-Text and Text-to-RDF (semantic parsing) respectively (RDF stands for Resource Description Framework, a standard for describing web resources). T2G is acknowledged as a harder task than G2T. The best models generally use PLMs and fine-tune them for the target modality at hand (either graph or text). This is possible, for example, by re-framing the T2G and G2T generations as a sequence to sequence (Seq2Seq) generation problem, which well suits fine-tuning PLMs. The Seq2Seq formulation requires a linearization of any input graph, which is not unique.

SUMMARY

Principles of the invention provide techniques for reinforced generation (reinforcement learning for text and knowledge graph bi-directional generation using pretrained language models). In one aspect, an exemplary method includes the steps of obtaining access to a pretrained encoder-decoder language model; using a dataset including a plurality of text-graph pairs, carrying out first fine-tuning training on the pre-trained language model by minimizing cross-entropy loss, wherein a text portion of each text-graph pair includes a list of text tokens and a graph portion of each text-graph pair includes a list of graph tokens, the first fine-tuning training resulting in an intermediate model; carrying out second fine-tuning training on the intermediate model, by reinforcement learning, to obtain a final model; and making the final model available for deployment.

In another aspect, a non-transitory computer readable medium includes computer executable instructions which when executed by a computer cause the computer to perform the method just described.

In still another aspect, an exemplary apparatus includes a memory; and at least one processor, coupled to the memory, and operative to: obtain access to a pretrained encoder-decoder language model; using a dataset including a plurality of text-graph pairs, carry out first fine-tuning training on the pre-trained language model by minimizing cross-entropy loss, wherein a text portion of each text-graph pair includes a list of text tokens and a graph portion of each text-graph pair includes a list of graph tokens, the first fine-tuning training resulting in an intermediate model; carry out second fine-tuning training on the intermediate model, by reinforcement learning, to obtain a final model; and make the final model available for deployment.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

improve the technological process of computerized machine learning via improving the generation and deployment of T2G and/or G2T models;

automatic construction of knowledge bases from text;

generation of text from large KBs;

better results than prior art on public dataset(s);

extension to unsupervised data through translation cycle consistency;

model can be used as proxy to KB;

alternative to geometric deep learning approaches;

Improvement of results by using Reinforcement Learning to improve models for both translation directions;

Possibility of handling both text and graph as input and output natively for hybrid models (i.e. models trained on both modalities concurrently).

These and other features and advantages of the present invention will become apparent from the following detailed description of illustrative embodiments thereof, which is to be read in connection with the accompanying drawings.

BRIEF DESCRIPTION OF THE DRAWINGS

FIGS. 7, 8, 9, and 10 show non-limiting exemplary experimental results, according to aspects of the invention;

DETAILED DESCRIPTION

One or more embodiments advantageously provide automatic construction of relevant Knowledge Bases (KBs) from text, and generation of semantically meaningful text from KBs, employing ReGen, a bidirectional generation of text and graph leveraging Reinforcement Learning (RL) to improve performance. Graph linearization enables reframing both tasks as a sequence-to-sequence generation problem regardless of the generative direction, which in turn allows the use of reinforcement learning for sequence training where the model itself is employed as its own critic, leading to Self-Critical Sequence Training (SCST). The skilled artisan will be familiar with self-critical sequence training from, for example, co-assigned US Patent Publication 2019/0147355 of Steven J. Rennie et al. We have found that the use of RL via SCST benefits graph and text generation on two well-known datasets, referred to herein as DATASET 1 and DATASET 2. DATASET 1 includes aligned text and graphs—all parts of the graph are present in text; the dataset is curated with no missing parts. DATASET 2 also includes text linked to graphs, but the mapping is not exact (not curated); DATASET 2 is significantly larger than DATASET 1. Our system provides state-of-the-art results on DATASET 1 by significantly improving upon published results from a public challenge using DATASET 1 for both text-to-graph and graph-to-text generation tasks.

Figure 3:
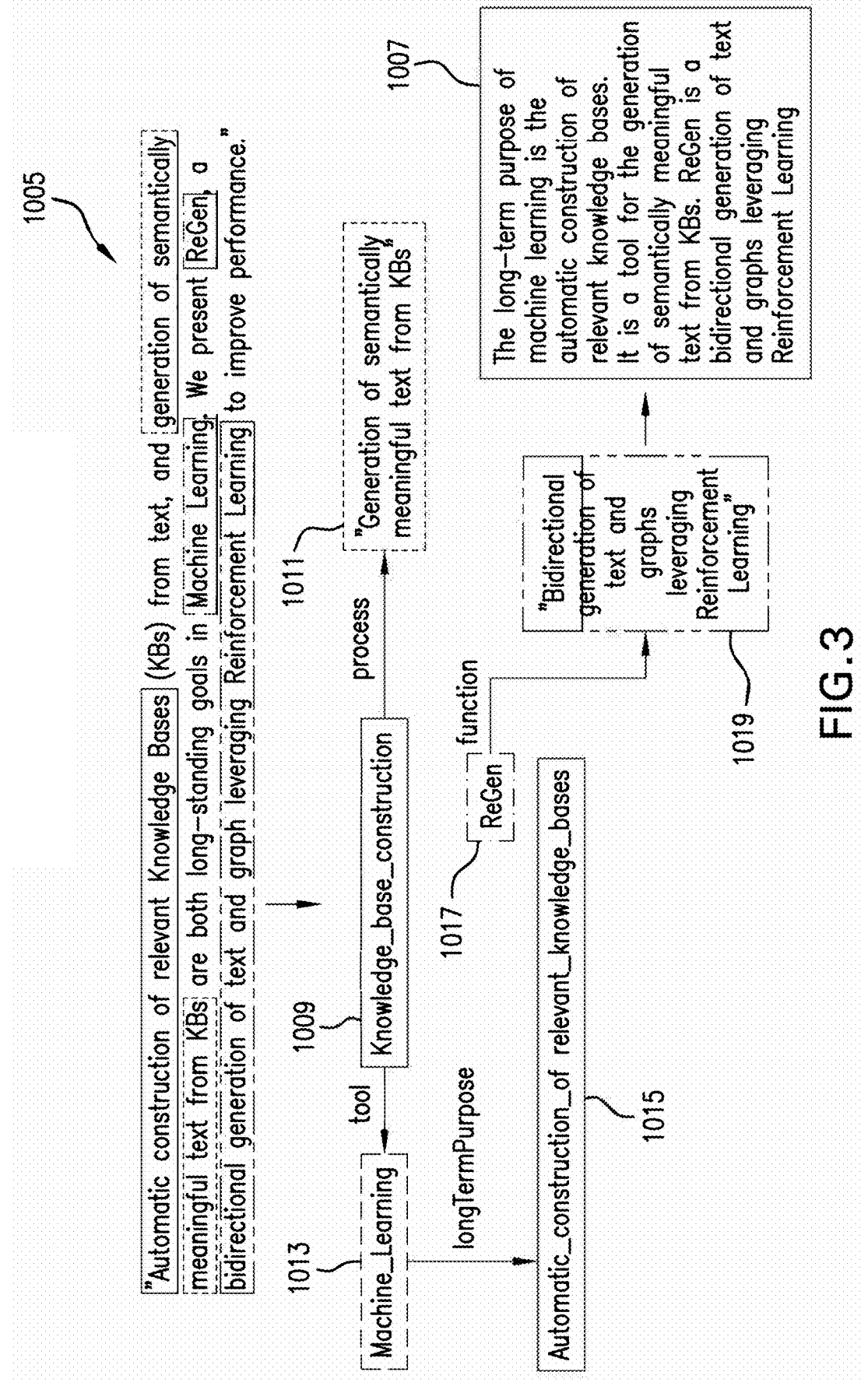
FIG. 3 shows T2G and G2T tasks implemented with aspects of the invention.

As noted, the Seq2Seq formulation requires a linearization of any input graph, which is not unique. We have found that this creates an opportunity for data augmentation where multiple linearizations are provided to the model at training time so the model learns the content represented by the graph, not the order of its sequential representation. One or more embodiments advantageously leverage the power of PLMs for both G2T and T2G generation tasks. We have found that we can improve upon the best results of the prior art for both T2G (Semantic Parsing) and G2T (Data-to-Text)

tasks. To illustrate the task of generation, FIG. 3 provides examples of G2T and T2G outputs obtained using an exemplary generation framework, according to an aspect of the invention. The input for T2G is shown at 1005. The model generates a graph from the input text by simultaneously extracting relevant nodes and linking them coherently. Examples of these nodes are given as 1009, 1011, 1013, 1015, 1017, and 1019. Some of these nodes are clearly extracted from the input text (1011, 1013, 1015, 1017, 1019), whereas a node like 1009 is generated by the model (since this is a generative model). This graph is created by capturing the facts from the input sentences. Then, this graph was used as input to generate text. For the G2T task, another model starts from the generated graph and generates semantically relevant text from it. As will be appreciated by the skilled artisan, the final text 1007 is quite readable and captures most facts from the original abstract sentences despite a strong domain mismatch between input data and training data, which both models were built on. Both models were trained using RL, specifically Self-Critical Sequence Training (SCST).

FIG. 3 thus presents actual examples of generation for Text-to-Graph and Graph-to-Text tasks using best RL models in accordance with aspects of the invention. The text sample was processed through the best models. First, a graph was created capturing the facts from the input sentences. Then, this graph was used as input to generate text. Despite a strong domain mismatch between input data and models, the generated paragraph is capturing most of the original sentences content. Both models were trained using RL, specifically Self-Critical Sequence Training (SCST).

Figure 4:
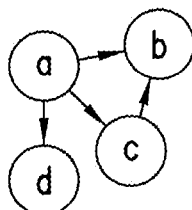
FIG. 4 shows graph linearization according to aspects of the invention.

FIG. 4 shows aspects of graph linearization. Consider a directed graph G with vertices (nodes) $\mathcal{V}$ and edges $\mathcal{E}$. The edges have directions indicated by the arrows. The vertices are given by the set $\mathcal{V}=\{a, b, c, d\}$. The directed edges are given by the set $\mathcal{E}=\{(a, b), (a, c), (a, d), (c, b)\}$. The graph can be placed into a linearized form $G_L$. However, as depicted, this linearization is not unique—all permutations are valid. The redundancy of entries and relationship operators $(a, r_{ab}, b)$ implies a long $G_L$ sequence. Note, a and b are nodes and $r_{ab}$ is the relationship between them.

Since both T2G and G2T generative tasks can be formulated as a Seq2Seq problem, one or more embodiments employ Reinforcement Learning (RL) as part of the PLMs fine-tuning on the target domain data. For both G2T and T2G tasks, a differentiable function such as the cross-entropy (CE) loss function is often used, since minimizing it results in maximizing the probability of generating the correct token/word. However, when it comes to evaluating a model's performance, benchmarks often use known text quality score/metrics for G2T, or linearized graph quality score/metrics scores for T2G, none of which are differentiable. For convenience, various G2T metrics are designated herein as G2T METRIC 1, G2T METRIC 2, G2T METRIC 3, G2T METRIC 4, and G2T METRIC 5. For convenience, various T2G metrics are designated herein as T2G METRIC 1, T2G METRIC 2, and T2G METRIC 3. The skilled artisan is familiar with suitable G2T and T2G metrics. During training, it is generally believed that by minimizing the CE loss, the model will tend towards better prediction of the target tokens, hence improving on evaluation metrics as a beneficial by-product. Advantageously, RL provides a framework where model parameters can be updated so as to improve evaluation metrics directly. One or more embodiments employ Self-Critical Sequence Training (SCST) for both T2G and G2T training.

One or more embodiments employ RL-based sequence training, specifically SCST, for both G2T and T2G tasks. To the best of our knowledge, this is the first time that RL based training is employed to the bi-directional generation of text and graph. Furthermore, to the best of our knowledge, this is the first time it is introduced for a T2G task. In one or more embodiments, the reward is only provided when valid edges are generated, otherwise penalize instead. In the case of text, for example, when generating the sequence of tokens, the reward can typically only be obtained at the end. In the case of a graph, it is also possible to wait until the end to generate the reward; i.e., wait until the whole graph is generated. However, one could imagine using partial rewards (in the case of a graph, for example, building one edge at a time).

We have found that one or more embodiments provide better performance than the best systems reported for the aforementioned public challenge. One or more embodiments employ SCST-based training for both T2G and G2T tasks, including a best rewards combination. In exemplary experiments, we constructed subject and relation-object boundaries from DATASET 2 sentence-triples pairs and showed performance of one or more embodiments for both T2G and G2T tasks. One or more embodiments adapt the large-scale DATASET 2 corpus for T2G and G2T tasks. Our experiments confirm the benefit of an SCST-based fine-tuning approach according to one or more embodiments over CE-trained baselines.

Models

In one or more embodiments, models are trained on a dataset $\mathcal{D}$ composed of a set of $(x_T, x_G)^i$ samples, where $x_T$ is made of text (one or more sentences), and $x_G$ is a graph represented as a list of triples $x_G=[(s^1, p^1, o^1), \ldots, (s^K, p^K, o^K)]$, where the k-th triple is composed of a subject $s^k$, predicate (relationship) $p^k$, and object $o^k$. The superscript i denotes the i-th sample in $\mathcal{D}$. For G2T, the model is given $x_G$ as input and must generate $\hat{x}_T$. A cross-entropy loss is computed as an expectation:

$$\mathcal{L}_{CE}^T = \mathbb{E}_{r \sim \mathcal{D}}\left[-\log p_\theta^{G2T}(x_T)\right] \quad (1)$$

In the above, $$p_\theta^{G2T}(x_T)$$

is the distribution of the generated sequence $\hat{x}_T = T_{G2T}(x_G)$, $T_{G2T}(x_G)$ being the transformation from graph to text, and where the model is parameterized by $\theta$. Note that $\hat{x}_T[\hat{w}_1, \hat{w}_2, \ldots, \hat{w}_T]$ is a sequence of generated tokens/words. Similarly, for training a T2G model, the cross-entropy loss used in training is simply:

$$\mathcal{L}_{CE}^G = \mathbb{E}_{r \sim \mathcal{D}}\left[-\log p_\theta^{T2G}(x_G)\right] \quad (2)$$

In the above, $$p_\theta^{T2G}(x_G)$$

is the distribution of the generated graph $\hat{x}_G = T_{T2G}(x_T)$, $T_{T2G}(x_T)$ being the transformation from text to graph.

In both Eq. (1) and Eq. (2), $x_G$ is expressed as a sequence of tokens $t_j$ such that a list of triples $x_G$ turns into a list of tokens $[t_1, t_2, \ldots, t_M]$. This is simply done by adding tokens marking the subject, predicate, and object locations in the sequence such that each triple $(s^k, p^k, o^k)$ is turned into a sequence such as $$[<S>, w_1^s, <P>, w_1^p, w_2^p, <O>, w_1^o, w_2^o, w_3^o],$$

assuming the subject is made of one token, the predicate of two tokens, and the object of three tokens in this example. $<S>,<P>$, and $<O>$ are just special marker tokens to help the model know where subject, predicate and objects are located in the sequence.

One or more embodiments start from a pretrained encoder-decoder $\mathcal{M}$ model that is fine-tuned on either T2G to obtain $\mathcal{M}_T$, or the G2T task to obtain $\mathcal{M}_G$. One or more embodiments also provide a third kind of model $\mathcal{M}_{T+G}$ to be fine-tuned on both T2G and G2T samples; i.e., the model learns to generate in any direction, by supplying an input sample $x=[x_T; x_G]^T$ and a corresponding target for it. Input from each modality is prefixed by a task-specific string to distinguish samples ("Text to Graph:" for $x_T$ and "Graph to Text:" for $x_G$). For $\mathcal{M}_{T+G}$ models, the cross-entropy loss is similarly defined as for Eq. (1) and Eq. (2) such that:

$$\mathcal{L}_{CE}^{T+G} = \mathbb{E}_{x \sim \mathcal{D}}\left[-\log p_\theta(x)\right]$$

Figure 5:
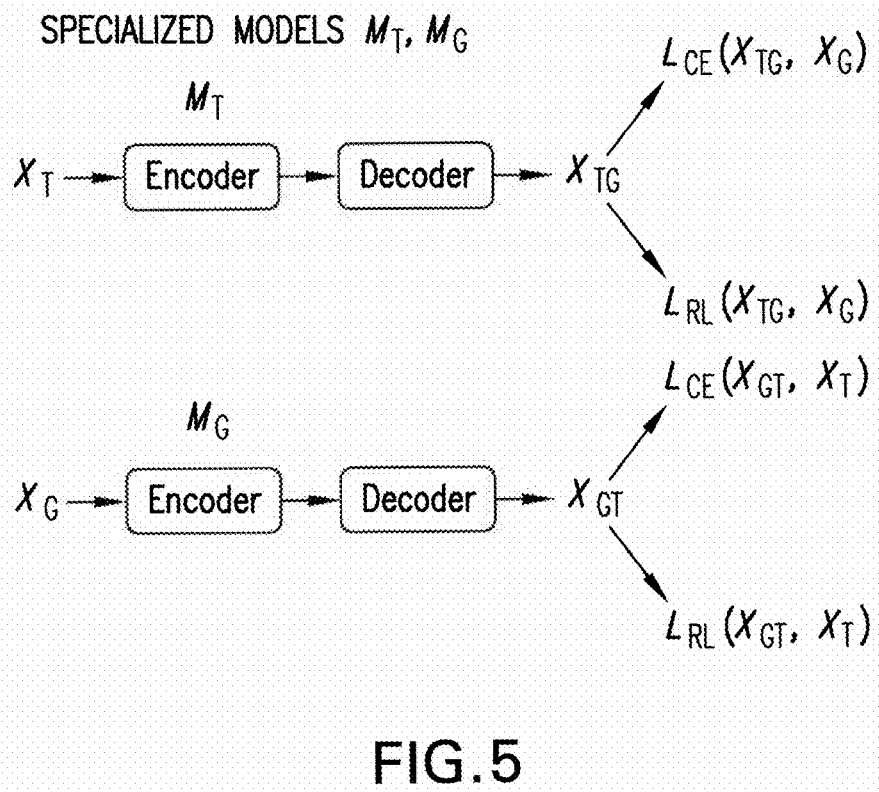
FIG. 5 shows T2G and G2T models according to aspects of the invention.
Figure 6:
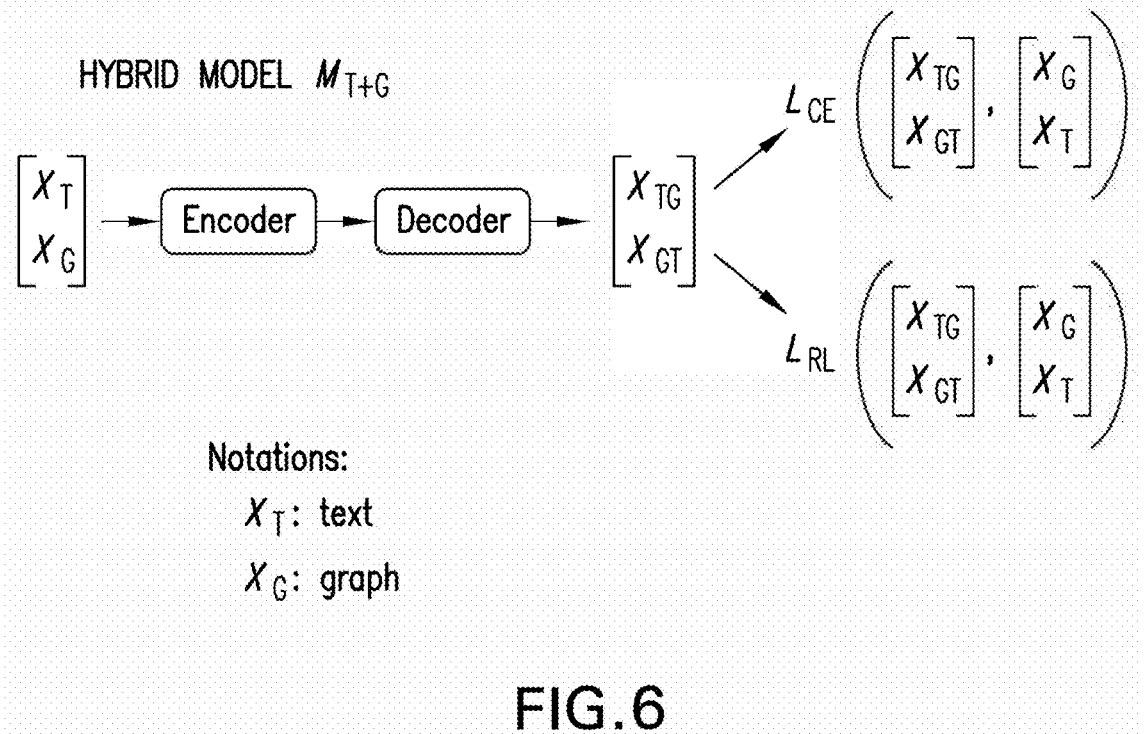
FIG. 6 shows combined T2G and G2T models (hybrid models) according to aspects of the invention.

Pertinent models are shown in FIGS. 5 and 6. By convention, models are referred to herein by their input modality T, G, or T+G. In FIGS. 5 and 6, specialized and hybrid models rely on the same losses for fine-tuning. However, specialized models are dedicated to a particular generation task while hybrid models can handle both generation directions.

Reinforcement Learning

A sequence generation task can be re-framed as a model picking the best word within a vocabulary to react to its environment and accounting for past predictions. Seq2Seq generation can then be reformulated into the Reinforcement Learning (RL) framework. A model is an agent that defines a policy resulting in the action of selecting each word during generation. Aspects of RL allow the optimization of a model's parameters $\theta$ by maximizing the expected value of the reward $R(\hat{x}^T)$ of a generated sequence $\hat{x}^T=[\hat{w}_1, \ldots, \hat{w}^T]$. To match usual deep learning conventions, minimize a loss expressed as its negative value:

$$\mathcal{L}_{RL} = \sum_{\hat{w}_1, \ldots, \hat{w}_T} p_\theta(\hat{w}_1, \ldots, \hat{w}_T) r(\hat{w}_1, \ldots, \hat{w}_T) \quad (3)$$

$$= -\mathbb{E}_{[\hat{w}_1, \ldots, \hat{w}_T] \sim p_\theta} R(\hat{w}_1, \ldots, \hat{w}_T),$$

$$= -\mathbb{E}_{\hat{x}_T \sim p_\theta} R(\hat{x}_T).$$

In the above, $R(\hat{x}^T)$ is the reward for the generated text which is often associated with non-differentiable metrics (such as those labelled herein as G2T METRIC 1, G2T METRIC 3, G2T METRIC 5, etc.). One or more embodiments circumvent this issue by using the following policy gradient method:

$$\nabla_{\theta}\mathcal{L}_{RL} \propto -(R(\hat{x}_T) - b)\nabla_{\theta}\log p_{\theta}(\hat{x}_T) \qquad (4)$$

In the above, b is a baseline used to reduce the variance of the gradient estimate; b can be any function, even a random variable, as long as it is independent of the actions taken to generate $\hat{x}^T$. In Self-Critical Sequence Training (SCST) (refer to the above-mentioned co-assigned US Patent Publication 2019/0147355 of Steven J. Rennie et al.), b is chosen to be the reward of $$x_T^*,$$

the output generated by the model by greedy max generation, hence the model serving as its own critic:

$$\nabla_{\theta}\mathcal{L}_{SCST} \propto -(R(\hat{x}_T) - R(x_T^*))\nabla_{\theta}\log p_{\theta}(\hat{x}_T) \qquad (5)$$

In the above, $\hat{x}^T$ is sampled from the model and $$x_T^*$$

is generated by greedy max. An interesting property of the baseline is that if $$R(\hat{x}^T) > R(x_T^*),$$

sampled $\hat{x}^T$ has higher reward than $$x_T^*),$$

and then the model is updated to reinforce the choices made by this generation. In the opposite case where $$R(\hat{x}^T) < R(x_T^*),$$

the model update will take the negative gradient or the opposite model update to subdue such generation. When $$R(\hat{x}^T) = R(x_T^*).$$

no update is performed on the model since the gradient is effectively zeroed out, regardless of the individual values $$R(\hat{x}^T) \text{ and } R(x_T^*).$$

This happens when $\hat{x}_T$ and $$x_T^*$$

are identical (greedy-max and sampled sequences are identical). In that case the sample is lost for RL as no update to the model will result from this sample. Use can be made of a Monte Carlo method of learning where a gradient update is applied in the direction decided by how $R(\hat{x}_T)$ compares to baseline b, the role of b being to reduce the variance of the gradient estimate. Variations exist regarding how to apply the gradients or on how to evaluate the baseline to minimize the gradient variance.

In training according to one or more embodiments, PLMs are first fine-tuned using LCE loss. Once they reach a generation quality that, under the metrics employed show recently good numbers, the training is switched to RL fine-tuning by minimizing LSCST (i.e., SCST loss $\mathcal{L}_{SCST}$). Given the teachings herein, the skilled artisan will be able to use heuristics to determine what "recently good" numbers are, on a case-by-case basis, depending on the domain (e.g., text or graph).

Experiments

Models: We used known PLMs for our experiments for two distinct models, a large (over 700M parameters) and base (over 200M parameters), with a special focus on large as it is the best performing of the two on various natural language processing (NLP) tasks. Models were fine-tuned to be either specialized on T2G (for text input, model designated as $M_T$) or G2T (for graph input, model designated as $M_G$) tasks, or to accommodate both directions of generation (model designated as $M_{T+G}$). Various models can be used; e.g., a denoising autoencoder for pretraining sequence-to-sequence models.

Data processing: Graphs are often represented as list of triples. However a model employed in one or more embodiments expects a sequence of input words/tokens to work on. The linearization of graph triples is ambiguous as there are many ways to traverse a graph (Breadth First Search, Depth First Search, random walk, etc.). In practice, linearize the triples in the order of the list provided by the dataset, but use this inherent linearization ambiguity as an opportunity to do data-augmentation. Indeed, models are first fine-tuned using cross-entropy loss that strongly penalizes generation if it is in any different order than the ground truth order. To avoid the model to overfit to the data and memorize observed triples order, augment the data by including a few permutations of the graph triples.

During graph linearization, encode the subject, predicate, and object positions by using <S>, <P>, <O> tokens. In practice, expand the model vocabulary with these special indivisible tokens that are not split during tokenization. No other preprocessing is done on the data for training.

Datasets

DATASET 1: We report results on DATASET 1 used in the aforementioned public challenge, which includes two tasks: RDF-to-text generation (G2T), and Text-to-RDF semantic parsing (T2G). The skilled artisan is familiar with Resource Description Framework (RDF) language commonly used in linked data framework. DATASET 1 uses RDF to encode graphs as sets of triples which are associated to one or more lexicalizations of one or more sentences each. Data for English and Russian are provided, but in our experiments, we only worked on the English subset including more than 10,000 train, more than 1,500 dev, more than 2,000 testA (semantic parsing), and more than 1,500 testB (data-to-text) samples (triples sets w/lexicalizations). The data is clustered semantically into sixteen categories seen in train and dev sets (Airport, Astronaut, Building, etc.), while 3 categories (Film, Scientist, and Musical-Work) were introduced in test and are unseen, i.e. not present in training. Results were aggregated for all, seen, and unseen categories during evaluation.

DATASET 2: To further study the robustness of one or more exemplary embodiments, we also carried out experiments using the DATASET 2. The graph-sentence alignments are curated. This serves an appropriate large scale test-bed for both G2T and T2G tasks. Unfortunately, this dataset lacks in entity/relation/object boundaries, which makes it difficult to evaluate systems for T2G tasks. To address this issue, we further processed the triple-text (with no triple boundaries) to create a list of triples using a publicly available properties lookup, via a known query service. Additionally, we limited the validation set and test set to 5 K and 50 K sentence-triples pairs respectively. Our training split after processing contained 6.3 million sentence-triples pairs.

Metrics: DATASET 1 provides automatic metrics to evaluate models. For G2T, we used metrics referred to herein as G2T METRIC 1, G2T METRIC 2, G2T METRIC 3, and G2T METRIC 4 that are provided by the aforementioned public challenge. For T2G, metrics referred to herein as T2G METRIC 1, T2G METRIC 2, and T2G METRIC 3 scores are utilized and computed for four levels of match: "Exact" (exact match of the candidate triple element with the reference triple element is required), "Type" (the candidate triple element should match at least partially with the reference triple element, and the element type (subject, predicate, object) should match with the reference), "Partial" (the candidate triple element should match at least partially with the reference triple element, and the element type (subject, predicate, object) is irrelevant) and "Strict" (exact match of the candidate triple element with the reference triple element is required, and the element type (subject, predicate, object) should match with the reference), which loosely correspond to different levels of relaxation of how close a match of an entity must be to the ground truth in content and position in a triple. Note that when generating graphs/RDFs, scoring metrics explore all possible permutations of a graph edges. For DATASET 2, we use the same metrics as for DATASET 1.

Experimental Results

For all experiments, PLMs were first exposed to the target datasets (DATASET 1, DATASET 2) by finetuning using LCE loss. They were then switched to RL training by optimizing the LSCST loss. Although no exact recipe has been established for Seq2Seq RL-training, starting from a good CE model helps RL training performance in practice (refer to the above-mentioned co-assigned US Patent Publication 2019/0147355 of Steven J. Rennie et al.). Therefore, we followed the subsequent simple approach: During fine-tuning, the evaluations are conducted on the validation set. From the CE phase, the best performing model iteration is selected based on the G2T METRIC 3 and T2G METRIC 1 score for the G2T and T2G tasks, respectively, to pursue RL fine-tuning. In case of G2T, potential ties in G2T METRIC 3 scores among candidate models, are resolved by using G2T METRIC 2, followed by the G2T Metric 4 metric. Note that early stopping selection of CE models led to good performance for PLM-base models as well. During the SCST phase, the best model iteration on the validation set is selected and its performance numbers on the test set are reported in the tables.

DATASET 1 G2T: For the aforementioned public challenge, the results of the top four systems for RDF-to-text task can be found in the table of FIG. 7 for all categories. We obtained G2T results for both large and base PLM models as well. For large PLM(s), ReGen G2T.CE is the best model from CE fine-tuning. ReGen G2T.RL is best model performance for SCST training while using G2T METRIC 3 as reward when starting from G2T.CE model. The table of FIG. 7 shows that the CE model according to one or more embodiments is better than alternative models, and the SCST results further improve significantly in all metrics. The gain obtained by SCST alone is quite significant and demonstrates the benefits of RL fine-tuning for this task. Even in averaging results of various seeded models, we have noted a sustained gain from SCST for CE models in all metrics. The table of FIG. 7 thus depicts G2T Best results on DATASET 1. The first four rows were the top performers of the aforementioned public challenge. Results for CE and RL models are presented for ReGen systems according to aspects of the invention so as to show gains from using SCST. The G2T.RL according to an aspect of the invention is the best system overall, fine-tuning a large PLM(s) model using the G2T METRIC 3 reward. G2T.RL.ES and G2T.RL.best show the impact of using early stopping (ES) or best CE selection for starting SCST fine-tuning on a base PLM(s) smaller model while using the G2T METRIC 2 reward.

Multiple reward candidates were investigated (G2T METRIC 1, G2T METRIC 2, G2T METRIC 3, G2T Metric 5) as well as some linear combinations of pairs of them. For large PLM(s), G2T METRIC 3 is consistently the best SCST reward, and improves all the other metrics scores as well. However, for 'smaller' models such as base PLM(s), G2T METRIC 2 is revealed to be the best reward for improving G2T METRIC 1 performance as expected. Again, SCST brings significant gains across all the metrics in that case. Note that for base PLM(s) model, selecting a G2T METRIC 3 reward improves G2T METRIC 3 results significantly.

Another interesting fact is that early stopping of CE model G2T.CE.ES (at 5 epochs) leads to the best SCST model G2T.RL.ES for base PLM(s), while selecting the best CE model G2T.CE.best (at 11 epochs) still showed some gains from SCST model G2T.RL.best. SCST should have a good starting point, but a better CE model that has seen a lot more epochs of the dataset maybe harder for SCST to "stir in" a better solution in the parameter space. Moreover, the test split contains unseen categories that are not present in the validation dataset, which render choices based on validation sub-optimal for the test dataset. The best models were seen to be specialized models MG. Early in our investigation, hybrid models were the best performing model for G2T reaching 0.547 G2T METRIC 1, 0.543 G2T METRIC 2 and 0.417 G2T METRIC 3. However, when batch size became larger (20-24 samples), the specialized models took the lead and retain it still.

For training, in our experiments, we optimized all our models; any suitable optimizer, such as a suitable adaptive gradient algorithm, can be used. We employed default values of $\beta$=[0.9, 0.999] and weight decay of $10^{-2}$. For learning rate, we used $5 \times 10^{-6}$ for all our experiments as it was better than $10^{-5}$ and $10^{-6}$. All our models were trained with 20-24 minibatch size on DATASET 1.

DATASET 1 T2G: Results for the Text-to-RDF task are reported in the table of FIG. 8 for all categories. PRIOR ART TEAM 1 and PRIOR ART TEAM 4 are the top performing teams. Again, the proposed ReGen T2G.CE model shows strong results that are better in term of all metrics, for all matching categories. In themselves, these numbers are a de facto new state-of-the-art for this dataset, as far as we know. The SCST model T2G.RL fails to improve on this model, however. The exact T2G METRIC 1 metric was used as the reward, but the model could never pull ahead of the CE model in our experiments. The exact T2G METRIC 1 metric may not be a strong enough reward to really capture the dynamics of graph generation properly for DATASET 1 as it is very rigid in its measure (one must have an exact match), although the same reward gave good results on DATASET 2. A more sensitive metric could possibly help. We even tried to use n-gram based metrics (like G2T METRIC 1) but to no avail. IN the table of FIG. 8, T2G Best results on DATASET 1 are presented. The top two teams were the first and second place winner of the aforementioned public challenge. The T2G.CE model in accordance with an exemplary embodiments improves upon all metrics for all matching schemes, providing good results for this afore-mentioned public challenge task. The T2G.RL model, while still better than previous best results, does not improve upon its CE counterpart.

DATASET 2 G2T: For the DATASET 2 dataset, results on Graph-to-Text generation are shown in FIG. 9. Similar to the experiments in DATASET 1, pick the best model during the CE fine-tuning based on the G2T METRIC 3 score and proceed with the RL fine-tuning. Note that the RL fine-tuning step helps boost the test split scores on all metrics. It is worth noting that the scores are believed to slightly underestimate the potential of our one or more embodiments because of the nature of the sentences in the DATASET 2 dataset. Unlike DATASET 1, in a paired text-graph sample in DATASET 2, the linearized graph does not usually cover all the concepts described in the corresponding text. This leads to underestimating when the hypothesis is scored against the reference using n-gram metrics. Thus, the table of FIG. 9 shows G2T Results for the DATASET 2 dataset. ReGen-CE establishes a baseline on this dataset. ReGen-SCST consistently improve on the baseline on all metrics, for validation and test sets.

DATASET 2 T2G: Results for the Text-to-Graph for DATASET 2 are reported in the table of FIG. 10. Once the CE finetuning is done, continue with the RL fine-tuning using exact T2G METRIC 1 as the reward. The performance is consistent with what is observed in the G2T task for DATASET 2, where the SCST step boosts the performance of the model. Thus, the table of FIG. 10 shows T2G DATASET 2 Results; ReGen-CE establishes a baseline of the dataset. ReGen-SCST improves results on the test set compared to ReGen-CE.

Summary: Results on DATASET 1 and DATASET 2 datasets demonstrated that RL fine-tuning of models leads to significant improvements of results for T2G and G2T, estab-lishing new state-of-the-art results for both tasks. For DATASET 1, T2G was a challenging task for RL fine-tuning. Results on DATASET 2 showed that RL fine-tuning is a viable option even on large-scale datasets.

Given the discussions herein, it will be appreciated that RL can be used for improving upon current generation for text-to-graph and graph-to-text tasks for DATASET 1 using pre-trained LMs. One or more embodiments provide a novel Seq2Seq training of models in T2G and G2T generation tasks, significantly improving on the previously published results for DATASET 1. Large scale training on the DATA-SET 2 dataset demonstrated that RL fine-tuning provides a robust way to improve upon regular model finetuning within a dataset that is orders of magnitude larger than the DATA-SET 1 starting point. We found that these gains could be obtained despite a weaker content overlap in text-graph data pairs for DATASET 2.

Figure 11:
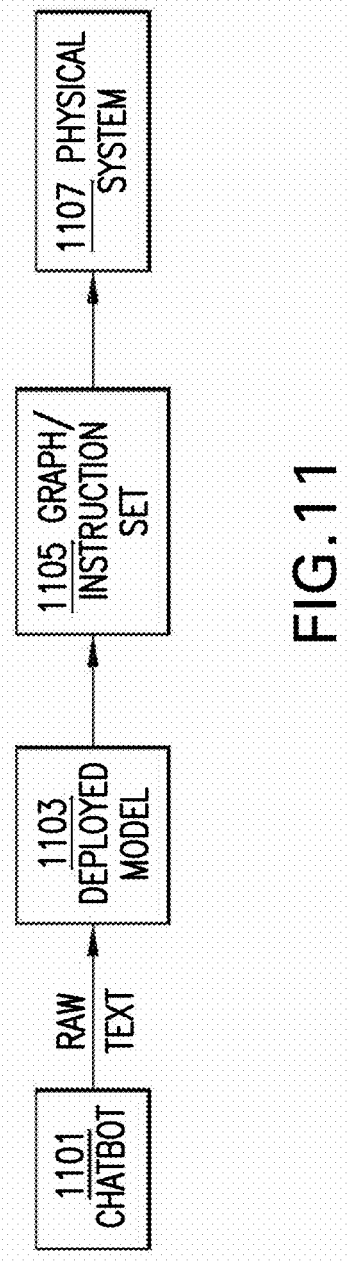
FIG. 11 shows control of a physical system in accordance with a generated knowledge graph according to aspects of the invention.

In one or more embodiments, a model trained in accor-dance with aspects of the invention is deployed and utilized. For example, generate a corresponding knowledge graph from obtained input text in accordance with a deployed final model 1103. Referring to FIG. 11, a physical system 1107 can be controlled in accordance with the generated knowl-edge graph. In a non-limiting example, obtain raw text, e.g., from what was typed into a chatbot 1101. Generate a graph 1105 which is equivalent to an instruction set and control the physical system with the instruction set. The physical system can be any suitable system such as a computer system, robot, vehicle, industrial machine, tool, or the like. In other aspects, generate a story using characters (nodes) and actions (edges), or extract concepts from text to evaluate for factual content.

Recapitulation

Given the discussion thus far, it will be appreciated that, in general terms, an exemplary method, according to an aspect of the invention, includes the step of obtaining access to a pretrained encoder-decoder language model. The method further includes, using a dataset including a plurality of text-graph pairs, carrying out first fine-tuning training on the pre-trained language model by minimizing cross-entropy loss. A text portion of each text-graph pair includes a list of text tokens and a graph portion of each text-graph pair includes a list of graph tokens. The first fine-tuning training results in an intermediate model. A still further step includes carrying out second fine-tuning training on the intermediate model, by reinforcement learning, to obtain a final model. An even further step includes making the final model available for deployment. Refer to the above discussion of starting from a pretrained encoder-decoder $\mathcal{M}$ model that is fine-tuned on either T2G to obtain $\mathcal{M}_T$, or the G2T task to obtain $\mathcal{M}_G$. Refer also to the third kind of model $\mathcal{M}_{T+G}$ to be fine-tuned on both T2G and G2T samples. For G2T cross-entropy, see Eq. (1). For T2G cross-entropy, see Eq. (2). The intermediate model is simply the model once cross-entropy training is complete, based on heuristics or the like. For RL training, see Eq. (5). The final model, after RL training, can be made available for deployment, for example, by providing access to the model stored in persistent storage 113 over a WAN 102 (see discussion of FIG. 12 below), via an application programming interface (API), or in other ways that will be apparent to the skilled artisan, given the teachings herein.

The skilled artisan, given the teachings herein, can select one or more appropriate pretrained encoder-decoder lan-guage models, and can obtain access, for example, in a manner analogous to the making available of the final model for deployment, as described just above.

One or more embodiments further include obtaining the list of graph tokens by linearizing a plurality of sets of triples, where each set of triples includes a subject, a relationship, and an object, into a corresponding entry in the list of graph tokens with marker tokens for the subject, the relationship, and the object. The text is typically already a linear sequence of words/tokens. See, for example, above discussion of FIG. 4, and discussion of adding tokens marking the subject, predicate, and object locations in the sequence such that each triple $(s^k, p^k, o^k)$ is turned into a sequence such as $$[ <S>, w_1^s, <P>, w_1^p, w_2^p, <O>, w_1^o, w_2^o, w_3^o ],$$

assuming the subject is made of one token, the predicate of two tokens, and the object of three tokens in this example. <S>,<P>, and <O> are just special marker tokens to help the model know where subject, predicate and objects are located in the sequence.

In one or more embodiments, carrying out the second fine-tuning training on the intermediate model, by reinforcement learning, includes applying self-critical sequence training.

In one or more embodiments, applying self-critical sequence training includes minimizing a loss function LSCST in accordance with Eq. (5). This use of SCST can be done for both T2G and G2T. In Eq. (5), $\theta$ is a model parameterizing factor, p is a policy ("policy" is a standard terminology in RL) represented by the intermediate model parameterized by $\theta$, R is a reward, and $\hat{x}^T$ is a generated sequence sampled from the intermediate model (i.e., $\hat{x}_T$ is what the model generates from an input). SCST means Self-Critical Sequence Training so the models "critiques" itself. Furthermore, $$x_T^*$$

is a generated sequence obtained by greedy max. Greedy max decode is a standard terminology that means that at every token that needs to be generated, choose the token with the maximum score. This approach for each token is called "greedy." $\nabla$ is just the "Del" (or Nabla) operator used to represent the first order differential vector for multivariate calculus. Eq. (5) essentially says that the gradient of loss is proportional to the negative of the gradient of policy for the given text multiplied by difference on reward of the two texts. Del/Nabla is the gradient over the parameter $\theta$ of the loss. In machine learning, a goal is to improve upon a model by minimizing the loss. For example, change parameters (here, $\theta$) such as weights to improve the model and minimize the loss.

In some instances (T2G), the first and second fine tuning training each include fine tuning training to implement text to knowledge graph generation. In such instances, the minimizing of the cross-entropy loss is carried out, for example, in accordance with Eq. (2). In Eq, (2), $\mathscr{L}$ subscript CE superscript G is the cross-entropy loss, T2G denotes text-to-graph, $\theta$ is a model parameterizing factor, p is a policy represented by the intermediate model parameterized by $\theta$, $x_G$ is a graph to be generated, $\mathcal{D}$ is the dataset, and E is expectation.

One or more embodiments further include deploying the final model, and generating a corresponding knowledge graph from obtained input text in accordance with the deployed final model. For example, deploy the model 1103 using one of the deployment techniques as discussed, as seen in FIG. 11. One or more such embodiments further include controlling a physical system 1107 in accordance with the generated knowledge graph. For example, obtain raw text, e.g., from what was typed into a chatbot (or any other suitable source), generate a graph 1105 which is equivalent to an instruction set, and control the system 1107 via instructions of the instruction set.

In other instances (G2T), the first and second fine tuning training each include fine tuning training to implement knowledge graph to text generation. In such instances, the minimizing of the cross-entropy loss is carried out, for example, in accordance with Eq. (1). In Eq. (1), $\mathscr{L}$ subscript CE superscript T is the cross-entropy loss, G2T denotes graph-to-text, $\theta$ is a model parameterizing factor, p is a policy represented by the intermediate model parameterized by $\theta$, $x_T$ is text to be generated, $\mathcal{D}$ is the dataset, and E is expectation.

One or more embodiments further include deploying the final model, and generating corresponding text from an obtained input knowledge graph in accordance with the deployed final model (essentially the opposite of FIG. 11).

As noted above, a bidirectional case is also possible. Thus, in some cases, the first and second fine tuning training each include fine tuning training to implement both knowledge graph to text generation and text to knowledge graph generation. The resulting final model can, if desired, be deployed using techniques as discussed. Corresponding text can be generated from an obtained input knowledge graph in accordance with the deployed final model, and a corresponding knowledge graph can be generated from obtained input text in accordance with the deployed final model. As seen in FIG. 11, a physical system can be controlled in accordance with the generated knowledge graph.

Aspects of the invention can be implemented, for example, by software, written in a high-level language, implementing the equations and logic set forth herein, compiled into executable code, and execute don one or more hardware processors. Hardware acceleration could also be employed in some cases, as appropriate.

In another aspect, a non-transitory computer readable medium includes computer executable instructions which when executed by a computer cause the computer to perform any one, some, or all of the method steps just described. See, e.g., FIG. 12 and accompanying text.

In still another aspect, an exemplary apparatus includes a memory; and at least one processor, coupled to the memory, and operative to perform any one, some, or all of the method steps just described. See, e.g., FIG. 12 and accompanying text.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 12:
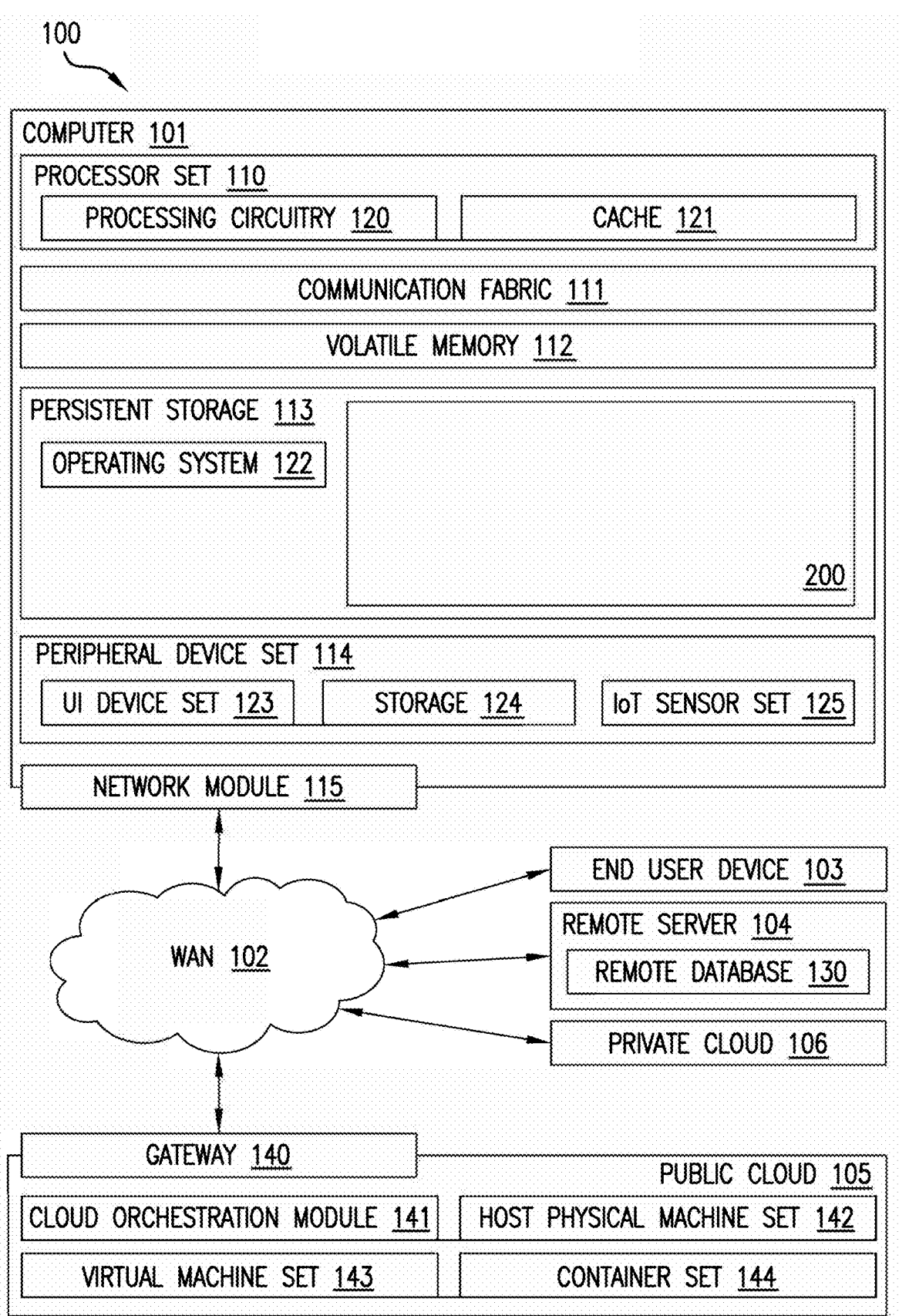
FIG. 12 depicts a computing environment according to an embodiment of the present invention.

Refer now to FIG. 12.

Computing environment 100 contains an example of an environment for the execution of at least some of the computer code involved in performing the inventive methods, such as training models as described herein and/or deploying and running the trained models, as seen at 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Figure 1:
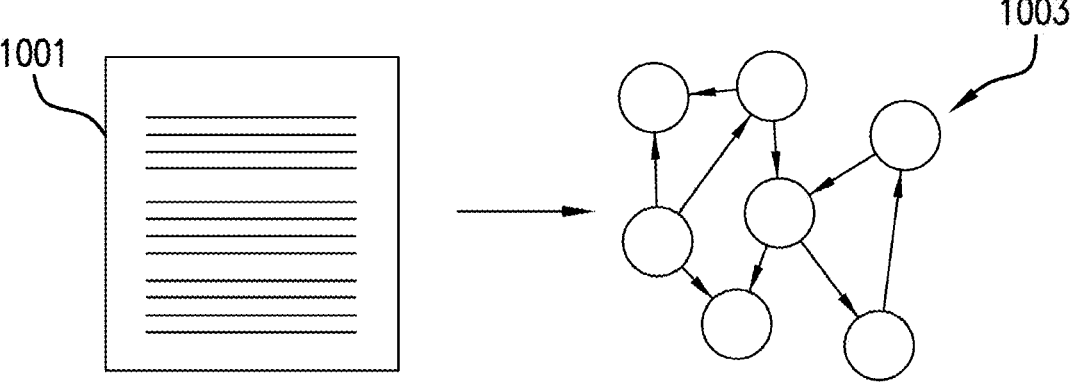
FIG. 1 depicts generating KBs from text, which can be implemented using aspects of the invention.
Figure 2:
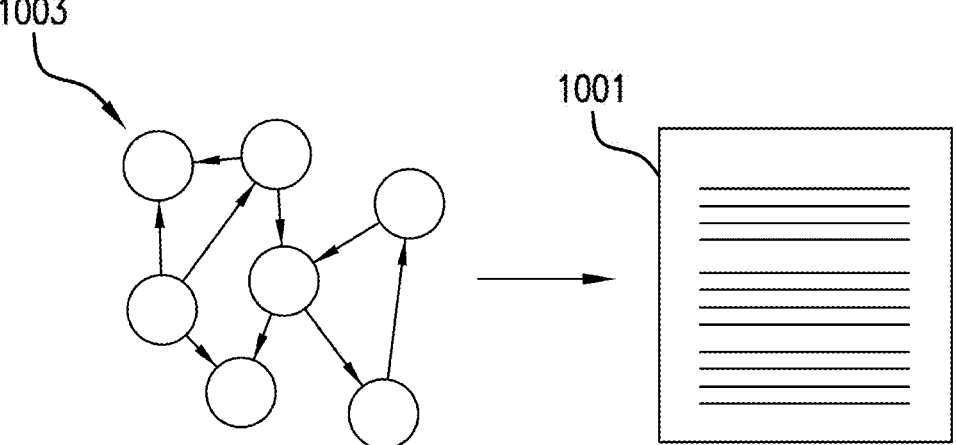
FIG. 2 depicts generating text from KBs, which can be implemented using aspects of the invention.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments of the invention, or elements thereof, can thus be implemented in the form of an apparatus including a memory and at least one processor that is coupled to the memory and operative to perform exemplary method steps. FIG. 12 depicts a computer system that may be useful in implementing one or more aspects and/or elements of the invention It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining access to a pretrained encoder-decoder language model;
obtaining a list of graph tokens by linearizing a plurality of sets of triples, each set of triples comprising a subject, a relationship, and an object, into a corresponding entry in the list of graph tokens with marker tokens for the subject, the relationship, and the object;
using a dataset comprising a plurality of text-graph pairs, carrying out first fine-tuning training on the pre-trained language model by minimizing cross-entropy loss, wherein a text portion of each text-graph pair comprises a list of text tokens and a graph portion of each text-graph pair comprises the list of graph tokens, the first fine-tuning training resulting in an intermediate model;
carrying out second fine-tuning training on the intermediate model, by reinforcement learning and applying self-critical sequence training, to obtain a final model, wherein the first and second fine tuning training each comprise fine tuning training to implement both knowledge graph to text generation and text to knowledge graph generation; and
making the final model available for deployment.

2. The method of claim 1, where applying self-critical sequence training comprises minimizing a loss function $L_{SCST}$ in accordance with:

$$\nabla_\theta \mathcal{L}_{SCST} \propto -(R(\hat{x}_T) - R(x_T^*))\nabla_\theta \log p_\theta(\hat{x}_T)$$

wherein:
$\theta$ is a model parameterizing factor;
p is a policy represented by the intermediate model parameterized by $\theta$;
R is a reward;
$\hat{x}^T$ is a generated sequence sampled from the intermediate model; and $$x_T^*$$

is generated sequence obtained by greedy max.

3. The method of claim 1, wherein the minimizing of the cross-entropy loss is carried out in accordance with:

$$\mathcal{L}_{CE}^G = \underset{x \sim \mathcal{D}}{\mathbb{E}}\left[-\log p_\theta^{T2G}(x_G)\right]$$

wherein:

$$\mathcal{L}_{CE}^G$$

is the cross-entropy loss;
T2G denotes graph-to-text;
$\theta$ is a model parameterizing factor;
p is a policy represented by the intermediate model parameterized by $\theta$;
$x_G$ is text to be generated;
$\mathcal{D}$ is the dataset;
and $\mathbb{E}$ is expectation.

4. The method of claim 1, further comprising:

deploying the final model; and generating a corresponding knowledge graph from obtained input text in accordance with the deployed final model.

5. The method of claim 4, further comprising controlling a physical system in accordance with the generated knowledge graph.

6. The method of claim 1, wherein the minimizing of cross-entropy loss is carried out in accordance with:

$$\mathcal{L}_{CE}^{T} = \mathbb{E}_{r,\tau_{x}}\left[-\log p_{\theta}^{G2T}(x_{T})\right]$$

wherein:

$$\mathcal{L}_{CE}^{T}$$

is the cross-entropy loss;

G2T denotes graph-to-text;

$\theta$ is a model parameterizing factor;

p is a policy represented by the intermediate model parameterized by $\theta$;

$x_{T}$ is text to be generated;

$\mathcal{D}$ is the dataset;

and $\mathbb{E}$ is expectation.

7. The method of claim 1, further comprising:

deploying the final model; and generating corresponding text from an obtained input knowledge graph in accordance with the deployed final model.

8. The method of claim 1, further comprising:

deploying the final model;

generating corresponding text from an obtained input knowledge graph in accordance with the deployed final model; and generating a corresponding knowledge graph from obtained input text in accordance with the deployed final model.

9. The method of claim 8, further comprising controlling a physical system in accordance with the generated knowledge graph.

10. A non-transitory computer readable medium comprising computer executable instructions which when executed by a computer cause the computer to perform the method of:

obtaining access to a pretrained encoder-decoder language model;

obtaining a list of graph tokens by linearizing a plurality of sets of triples, each set of triples comprising a subject, a relationship, and an object, into a corresponding entry in the list of graph tokens with marker tokens for the subject, the relationship, and the object;

using a dataset comprising a plurality of text-graph pairs, carrying out first fine-tuning training on the pre-trained language model by minimizing cross-entropy loss, wherein a text portion of each text-graph pair comprises a list of text tokens and a graph portion of each text-graph pair comprises the list of graph tokens, the first fine-tuning training resulting in an intermediate model;

carrying out second fine-tuning training on the intermediate model, by reinforcement learning and applying self-critical sequence training, to obtain a final model, wherein the first and second fine tuning training each comprise fine tuning training to implement both knowledge graph to text generation and text to knowledge graph generation; and making the final model available for deployment.

11. An apparatus comprising:

a memory; and at least one processor, coupled to the memory, and operative to:

obtain access to a pretrained encoder-decoder language model;

obtain a list of graph tokens by linearizing a plurality of sets of triples, each set of triples comprising a subject, a relationship, and an object, into a corresponding entry in the list of graph tokens with marker tokens for the subject, the relationship, and the object;

using a dataset comprising a plurality of text-graph pairs, carry out first fine-tuning training on the pretrained language model by minimizing cross-entropy loss, wherein a text portion of each text-graph pair comprises a list of text tokens and a graph portion of each text-graph pair comprises the list of graph tokens, the first fine-tuning training resulting in an intermediate model;

carry out second fine-tuning training on the intermediate model, by reinforcement learning and applying self-critical sequence training, to obtain a final model, wherein the first and second fine tuning training each comprise fine tuning training to implement both knowledge graph to text generation and text to knowledge graph generation; and make the final model available for deployment.

\* \* \* \* \*